United States Patent [19]

Magnin et al.

[11] Patent Number: 4,671,294
[45] Date of Patent: Jun. 9, 1987

[54] PULSED DOPPLER FLOW MAPPING APPARATUS

[75] Inventors: Paul A. Magnin, Andover; Tomohiro Hasegawa, Stoneham, both of Mass.

[73] Assignee: Hewlett-Packard Company, Palo Alto, Calif.

[21] Appl. No.: 765,897

[22] Filed: Aug. 14, 1985

[51] Int. Cl.$^4$ ............................................. A61B 10/00
[52] U.S. Cl. .................................... 128/663; 73/861.25
[58] Field of Search ....................... 128/663; 73/861.25

[56] References Cited

U.S. PATENT DOCUMENTS 4,542,657  9/1985  Barber et al. ..................... 73/861.25

OTHER PUBLICATIONS

Brandestini, et al., "Blood Flow Imaging Using a Discrete-Time Frequency Meter", 1978 Ultrasonics Symposium Proceedings, pp. 348-352.

Primary Examiner—Kyle L. Howell
Assistant Examiner—Ruth S. Smith
Attorney, Agent, or Firm—Donald N. Timbie

[57] ABSTRACT

A pulsed Doppler imaging system is shown in which velocity of a fluid is attained by multiplying the quadrature samples of the reflections of one burst with the conjugate of the quadrature samples of the reflections of a previous burst for a number of pairs of equally spaced bursts, deriving the angle represented by the real and imaginary components of each multiplication and averaging the angles to attain an angle that is used in determining the velocity of the fluid in the sample volume from which the reflections are sampled.

3 Claims, 6 Drawing Figures

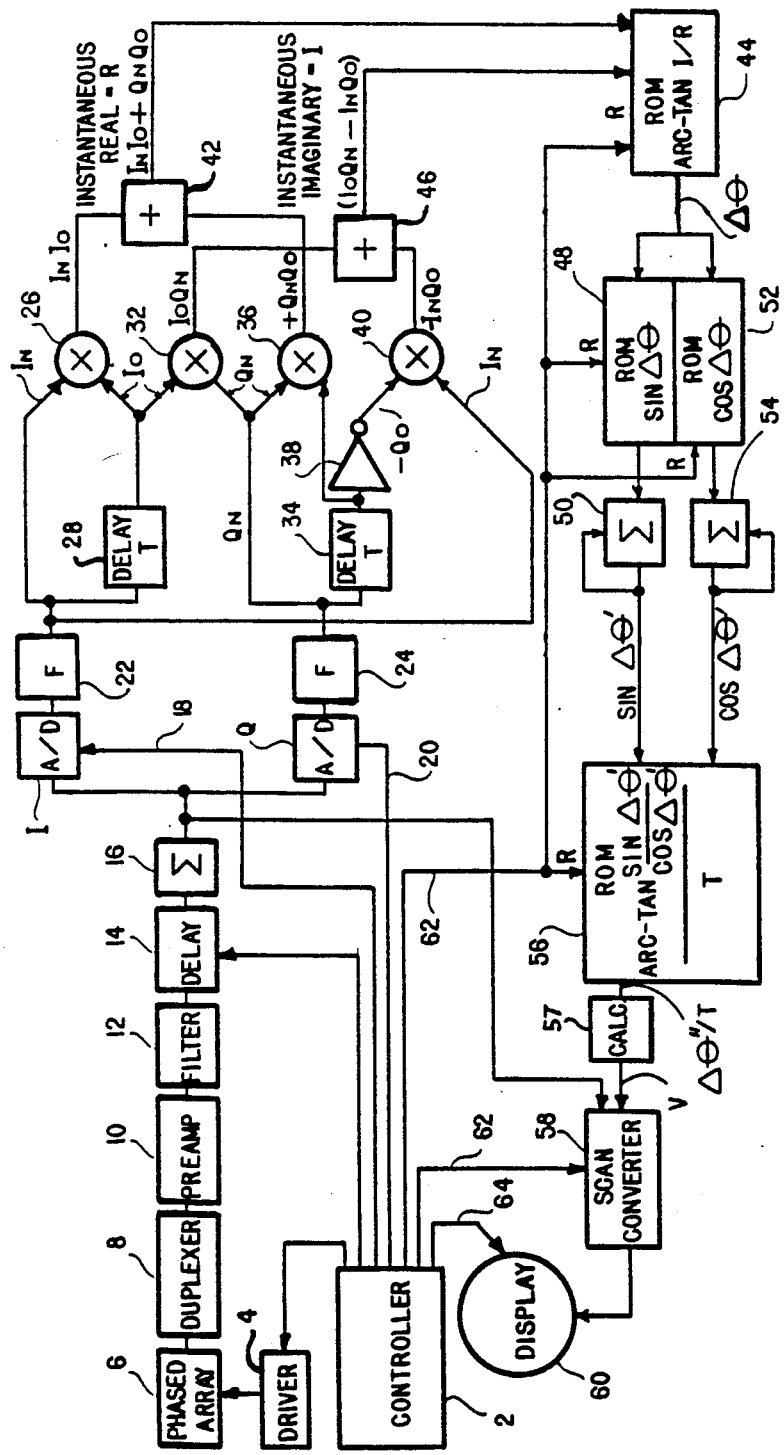

PULSED DOPPLER FLOW MAPPING APPARATUS

BACKGROUND OF THE INVENTION

The velocity of the flow of blood in an artery, vein or heart of a patient has been measured by using an electroacoustical transducer to transmit bursts of several cycles of ultrasonic pressure waves having a carrier frequency of $2\pi f_c$ into the body along a line that intersects the flow at an angle of other than 90°. A portion of the acoustic energy so transmitted is reflected back along the line toward the transducer by particles in the blood because they have a different acoustic impedance than the fluid in which they are immersed. The frequency of the pressure waves thus reflected depends on the component of the velocity of the particles along the line. In accordance with the Doppler principle, the frequency of the pressure waves thus reflected from a particle increases with the velocity at which it approaches the transducer; decreases with the velocity at which it recedes from the transducer; and remains the same if its component of velocity along the line is zero. For reasons understood by those skilled in the art, the average velocity of blood particles within a sample volume at a desired range can be determined by processing samples of electrical waves corresponding to reflections from blood particles in that sample volume. The size of the sample volume is proportional to the length of the transmitted burst in the body and inversely proportional to the azimuthal resolution of the transducer.

In a European patent application No. 83104067.0 published on 02.11.83 with a publication No. 0 092 841, the average velocity of the particles in a sample volume is determined as follows. The electrical waves at the output of the transducer that are respectively due to reflections of each of a given number of bursts from particles in a sample volume of interest are sampled at successive instants of time that are spaced by one-quarter of a cycle of the carrier frequency, $2\pi f_c$, so as to produce quadrature phased real and imaginary components of the reflections of each burst. The quadrature phased components of one burst and the conjugate of the quadrature phased components of the next burst are multiplied. This is done for all adjacent bursts so that if only seven are involved, there are six pairs of multiplications. The real components from all the multiplications are averaged and the imaginary components are averaged. The angle having a tangent determined by the ratio of the average of the imaginary components to the average of the real components can be shown to be the average of the phase changes of the reflected waves occurring between each pair of successive transmitted bursts, and this can be translated into the average frequency of the reflections from the particles. The average velocity can be derived from the average frequency.

Because this is in effect a vector addition of the quadrature components of the reflections of each transmitted burst, the result is dependent on their amplitudes, and because in practice the amplitude of one set of quadrature components can be much greater than the others due to factors not related to the velocity of the particles of interest, they can dominate the averages so that the velocity determined from them can have a considerable error.

BRIEF DESCRIPTION OF THE INVENTION

In accordance with one aspect of this invention, the real and imaginary components resulting from each multiplication are applied directly to means for determining the angle having a tangent equal to the ratio of these imaginary to these real components, and means are provided for obtaining the average of these angles. This avoids the errors resulting from the meaningless large amplitude of quadrature components resulting from the reflection from the moving wall of the vessel containing the particles.

In accordance with another aspect of this invention, special ways are provided for determining the average of the angles. At first, it might seem to be a straightforward matter if one looks at the vectors for the angles, but it is complicated by the fact that the phase angles determined from one successive pair of bursts may subtend the boundary between large positive angles and large negative angles. Means for taking these things into account are hereinafter referred to as "circular averagers".

In this type of circular averager, the average angle to be used is determined by what is termed a "majority rule". If, for example, the vectors from all but one multiplication are in the second quadrant and the one vector is in the third quadrant, 360° is added to that vector and the vector angles are then averaged.

In another type of circular averager, an odd number of vectors is used and the median (or middle one) is selected.

In a preferred form of circular averager, the sines and cosines of each angle are derived and summed, and the angle having a tangent equal to the ratio of the sum of the sines to the sum of the cosines is determined and then divided by the time between the bursts involved in the multiplication referred to.

BRIEF DESCRIPTION OF THE DRAWINGS

FIG. 1 is a block diagram of a pulsed Doppler system that determines the velocity of fluid flow in accordance with this invention;

FIG. 2 is a vector diagram illustrating the operation of the preferred form of circular averager;

FIG. 3 is a vector diagram illustrating the operation of a circular averager using the majority rule;

FIG. 4 is a vector diagram illustrating the operation of a circular averager using the median vector;

FIG. 5 is a vector diagram illustrating the vector addition that takes place in the system of the European patent application referred to in determining the change in phase angle that is used to determine velocity; and FIG. 6 is a vector diagram illustrating how the change in phase angle that is used in determining velocity is determined in accordance with this invention.

DETAILED DESCRIPTION OF THE INVENTION

In FIG. 1, a controller 2 provides the timing and synchronization signals for the system. Although not shown, it contains a master oscillator to which frequency dividers are coupled so as to provide pulses at the carrier frequency $2\pi f_c$. Groups of these pulses, each having a number depending on the number of cycles of pressure wave that are to be in a burst, are supplied to a driver 4 in sequence along with signals that determine the times at which the driver 4 respectively appliess the groups to different crystals, not shown, contained in a phased array 6 that functions as a transducer. This timing determines the direction of a beam of pressure waves that is transmitted by the array 6 into a body of a patient. Duplexers 8 are respectively connected between each of the crystals and inputs to preamplifiers 10. After passing through respective filters 12, the signals from each crystal are respectively applied to delays 14 that are respectively adjusted by signals from the controller 2 so as to cause the signals from the crystals due to reflections from a selected sample volume to arrive at the inputs of a summer 16 at the same time. The output of the summer 16 is therefore proportional to the sum of the reflections from particles in the sample volume that impinge on the different crystals in the phased array 6.

The output of the summer 16 is applied to an in-phase A/D, I, and to a quadrature-phase A/D, Q. Both A/D's are the same and are the sample-and-hold type. They are called "in-phase" and "quadrature" A/D's or samplers because they are caused to sample signals due to reflections from the desired sample volume at times that are separated by one-quarter of a cycle of the carrier frequency $2\pi f_c$ by signals respectively provided to them on lines 18 and 20 from the controller 2. A clutter filter 22 is connected to the output of the in-phase A/D, I, and a clutter filter 24 is connected to the output of the quadrature phase A/D, Q. These filters subtract a sample of the reflections of one burst from the sample of the reflections of the next burst so as to attenuate low frequency signals that are reflected from the walls defining the passageway through which the blood is flowing. This is important because these reflections have much greater amplitude than the reflections from the blood particles.

The output of the filter 22 is an in-phase component, $I_N$, due to reflections of a current burst of pressure waves and is applied to one input of a multiplier 26. A delay 28 of T, where T is the time between the transmission of bursts of pressure waves into the body by the phased array 6, is connected between the filter 22 and another input of the multiplier 26. The signal at this latter input is the in-phase component derived from the reflection of the previous burst of pressure waves transmitted by the phased array 6 and is designated $I_O$, the 0 indicating "old". Thus, the output of the multiplier 26 is $I_N I_O$.

The output of the filter 24 is a quadrature phase component $Q_N$ of the reflections of a current burst and is applied to one input of a multiplier 32. The other input of the multiplier 32 is connected to receive the signal $I_O$ from the output of the delay 28. Thus, the output of the multiplier 32 is $I_O Q_N$.

A delay 34 of T is connected between the output of the filter 24 and one input of a multiplier 36 so as to apply to that input a signal $Q_O$ which is the quadrature component derived from reflections of the pressure waves of a previous burst. The other input of the multiplier 36 is connected to receive the signal $Q_N$ from the filter 24 so as to provide an output $Q_N Q_O$.

The output of the filter 22 is connected to one input of a multiplier 40 so as to apply the signal $I_N$ thereto and the other input of the multiplier 40 is connected via an inverter 38 to the output of the delay 34 so as to receive the signal $-Q_O$. The output of the multiplier 40 is $-I_N Q_O$.

The circuit just described is a means for multiplying the quadrature components ($I_N$, $Q_N$) derived from a current burst of pressure waves with the conjugate of the quadrature components ($I_O$, $-Q_O$) derived from a previous burst of pressure waves. Inputs of an adder 42 are respectively connected to the outputs of the multipliers 26 and 36 so as to provide the real components ($I_N I_O$)+($Q_N Q_O$) resulting from the multiplications to a ROM 44, an inputs of an adder 46 are respectively connected to the outputs of the multipliers 32 and 40 so as to provide the imaginary components ($I_O Q_N$)-($I_N Q_O$) to the ROM 44.

For reasons which will subsequently be explained, the angle whose tangent equals the imaginary components ($I_O Q_N$)-($I_N Q_O$) divided by the real components ($I_N I_O$)+($Q_N Q_O$) is the angular change of the signals reflected from the selected sample volume that takes place during the time T. It is only necessary to divide this angular change by T in order to obtain the Doppler frequency F from which the average instantaneous value of velocity of the blood particles in the sample volume is derived. A value of F could be derived for each successive pair of bursts of pressure waves. These values of F could be averaged so as to make it possible to attain a more accurate value for the velocity of the blood in the sample volume.

Instead of averaging the frequencies in this manner, it is preferred to successively apply the angles to a circular averager which is comprised of a ROM 48 having stored therein the sines for a large number of the angles p66 $\theta$, a summer 50 coupled the output of the ROM 48, a ROM 52 having stored therein the cosines for a large number of the angles $\Delta\theta$, a summer 54 coupled to the output of the ROM 52, and a ROM 56. The output of the summer 50 is the sum of the sines of the $\Delta\theta$'s derived from each pair of bursts and is designated as sin $\Delta\theta'$. The output of the summer 54 is the sum of the cosines of the $\Delta\theta$'s derived from each pair of bursts and is designated as cos $\Delta\theta'$. The ROM 56 has stored therein the values of the angle, $\Delta\theta''$, whose tangent is sin $\Delta\theta'$/cos $\Delta\theta'$, divided by T for the expected combinations of sin $\Delta\theta'$ and cos $\Delta\theta'$ supplied by the summers 50 and 54. The output $\Delta\theta''/T$ of the ROM 56 is the average instantaneous frequency of the reflections from the blood particles in the selected sample volume, and a means 57 derives from $\Delta\theta''/T$ a signal representing the average velocity of the blood particles in the sample volume. All of these functions are performed in one ROM which acts as a vector summer.

The operation of the circular averager just described is now explained by reference to the vector diagram of FIG. 2. The vectors $V_1$ and $V_2$ are of the unit length and are at angles respectively having the average values of the sines and cosines supplied by the arctan ROM 44. The vector $V_3$ is at the angle $\Delta\theta''$ determined by the ROM 56.

If the circular averager operated in accordance with th majority rule and two angles $\Delta\theta$ are as indicated by the vectors $V_1'$ and $V_2'$ of FIG. 3 that are in the second quadrant and a third angle $\Delta\theta$ is represented by a vector $V_3'$ in the third quadrant, the latter would be changed by +360° to give it a sign corresponding to the sign of the majority of vectors and its angle would be averaged with the others.

FIG. 4 illustrates the operation of a circular averager that selects the middle or median vector. This requires an even number of samples out of clutter filters 22 and 24 so that there will be an odd number of $\Delta\theta$'s.

The signal $\Delta\theta''/T$ at the output of the ROM 56 is applied to a means 57 for calculating the average instantaneous velocity for the sample volume. The value of the velocity is applied to scan converter 58 that derives a suitable signal for display in a display means 60 that uses a raster of parallel lines. This is necessary because the values of velocity at the output of the means 57 are for points along radial lines.

The controller 2 provides signals on a line 62 for resetting the ROMs 44, 46, 50 and 54 after the number of bursts to be used in measuring the average instantaneous velocity of a selected sample volume have been processed. Because only a few bursts may be used in determining the velocity, its value is less accurate than if a larger number of bursts were used, but the time to obtain the value of the velocity is sufficiently short to permit a two-dimensional flow map to be displayed by the means 60.

The signal at the output of the summer 16 can be used to form an image and is supplied via the scan converter 58 to the display means 60.

Synchronization of the scan converter 58 and the display means 60 is respectively achieved by signals supplied over lines 62 and 64 by the controller 2.

In the interest of simplicity of illustration, FIGS. 5 and 6, which respectively indicate the results attained by the systems of the European patent application referred to and the results attained by this invention, are limited to using four bursts from which these vectors are derived. Because the system of the European application uses vector addition of the samples before the angular change is derived, the resultant angle is strongly affected by the amplitude of one of the samples whereas in the system of this invention, the resultant angle is not affected by the amplitude.

The following illustrates how the multiplication of conjugate quadrature signals obtained from the quadrature sampling of successive bursts provides the change in radians per second due to the Doppler effect. The quadrature components obtained by the quadrature sampling of reflections of a first burst are represented by $$e^{jwt1} \tag{1}$$

and the quadrature components obtained by the quadrature sampling of reflections of a second burst are represented by $$e^{jwt2} \tag{2}$$

If we multiply (1) by the conjugate of (2), we obtain $$(e^{jwt1}) \cdot (e^{-jwt2}) = e^{jwT} \tag{3}$$

Now if $w = w_c + w_d$, $w_c$ being the carrier that is transmitted and $w_d$ being the Doppler frequency, and if T is chosen to be an integral number of cycles of the carrier or if the Pulse Repetition Frequency, PRF, is a subharmonic of the carrier frequency, you get $$T = 1/PRF = (2\pi n/w_c) \tag{4}$$

and $$e^{jwT} = e^{j(w_c + w_d)T} = e^{jw_c(2\pi n/w_c) + jw_d T} \tag{5}$$

which simplifies to $$e^{jw_c(2\pi n/w_c) + jw_d T} = (e^{j2\pi n})(e^{jw_d T}) = e^{jw_d T} \tag{6}$$

Now if a four-quadrant arctangent is taken and divided by T, the result is $w_o$ which is the instantaneous Doppler frequency. Thus, for every two bursts, one can obtain the instantaneous Doppler shift frequency and the velocity, but by averaging the values of $w_d$ obtained by using more bursts, the frequency estimate and the velocity calculated therefrom can be improved.

In this proof, adjacent bursts separated by a time T were used, but the proof applies if the non-adjacent bursts are used.

What is claimed is:

1. Apparatus for deriving the velocity of fluid at each point in an image, comprising
    means for irradiating the fluid with bursts of a given number of pulsed cycles of a pressure wave, the bursts being separated from each other by T seconds, and T and the pressure wave carrier frequency being harmonically related,
    transducer means for producing an electrical signal corresponding to reflections of said bursts of pressure waves from the fluid,
    means for sampling the signals due to reflections of each burst from each point in the image at times spaced by one-quarter of a cycle of the pressure wave carrier frequency so as to derive quadrature components of the signal,
    means for respectively multiplying the quadrature components derived from each of a plurality of bursts with the conjugate of the quadrature components derived from a burst having a time separation of T therefrom,
    means for deriving from quadrature components resulting from each multiplication a signal indicative of the angle represented by them, and
    means for averaging the latter signals so as to derive a signal indicative of the velocity of the fluid at said point.

2. Apparatus as set forth in claim 1 wherein said means for deriving an average is a circular averager.

3. Apparatus as set forth in claim 1 wherein said last means is comprised of
    means for deriving from each signal representing an angle a first signal representing the sine of the angle,
    means for deriving from each signal representing an angle a second signal representing the cosine of the angle,
    means for deriving a sum of a plurality of said first signals,
    means for deriving a sum of a plurality of said second signals,
    means for deriving from the signals representing the sums a signal representing an average angle.

* * * * *